United States Patent
Rester et al.

(10) Patent No.: US 7,290,830 B2
(45) Date of Patent: Nov. 6, 2007

(54) GRILLE FACING METHOD AND ARTICLE OF MANUFACTURE

(76) Inventors: Robert Rester, 10841 S. Laurel Ave., Santa Fe Springs, CA (US) 90670; Li Junping, Dayon Road 9, Taiyuan Economic and Technological Development Zone, Shanxi Province (CN)

( * ) Notice: Subject to any disclaimer, the term of this patent is extended or adjusted under 35 U.S.C. 154(b) by 169 days.

(21) Appl. No.: 10/871,501

(22) Filed: Jun. 18, 2004

(65) Prior Publication Data

US 2005/0120537 A1 Jun. 9, 2005

Related U.S. Application Data

(60) Provisional application No. 60/479,673, filed on Jun. 18, 2003.

(51) Int. Cl.
*B60R 27/00* (2006.01)

(52) U.S. Cl. .................................................. 296/193.1
(58) Field of Classification Search ............. 296/193.1
See application file for complete search history.

(56) References Cited

U.S. PATENT DOCUMENTS

| 1,999,007 | A | * | 4/1935 | Green | .......................... 428/31 |
| 2,007,716 | A | * | 7/1935 | Green | .......................... 52/668 |
| 6,957,837 | B2 | * | 10/2005 | Stull | .......................... 293/115 |
| D526,941 | S | * | 8/2006 | Yamashita | .................. D12/163 |
| D526,943 | S | * | 8/2006 | Wu | .............................. D12/163 |
| 2005/0023863 | A1 | * | 2/2005 | Stull | ........................ 296/193.1 |
| 2005/0120537 | A1 | * | 6/2005 | Rester et al. | .................. 29/453 |

\* cited by examiner

*Primary Examiner*—H Gutman

(57) ABSTRACT

A method and article of manufacture for an automotive grille facing. Tracks or grooves are formed in the fins of a radiator grille on the exterior side of the grille. The track is adapted to receive an insert having a bead that fits within the groove.

18 Claims, 8 Drawing Sheets

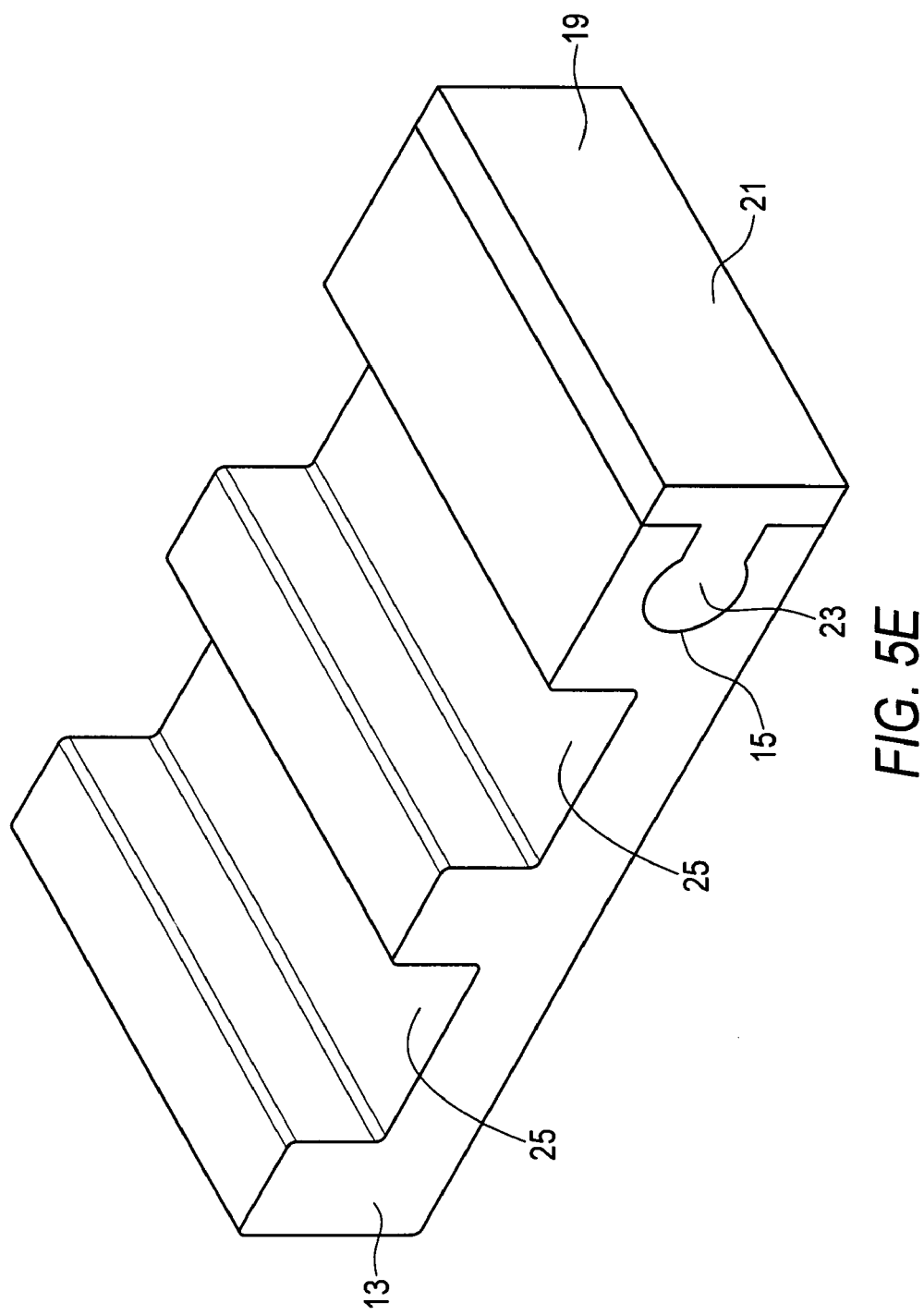

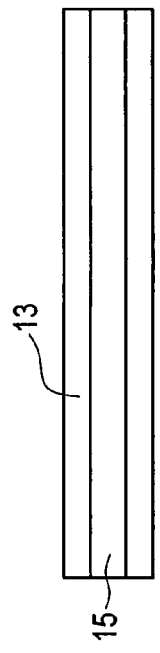
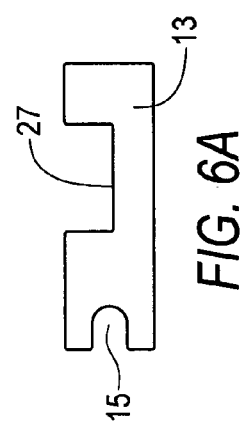
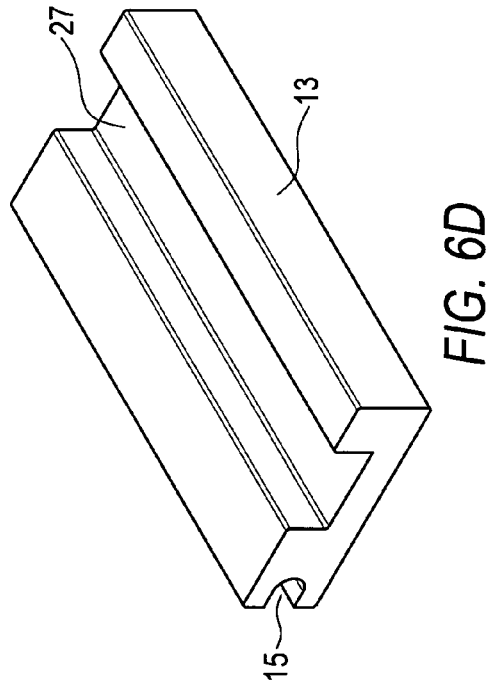
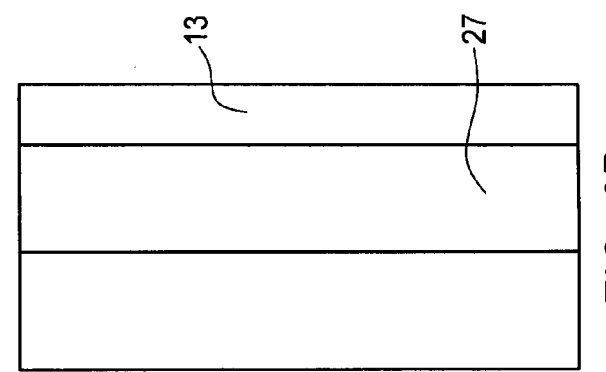

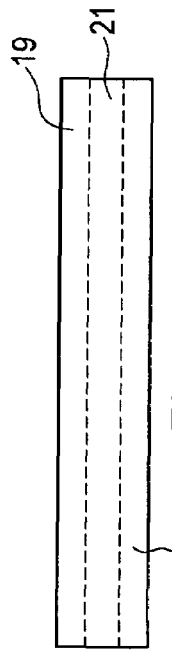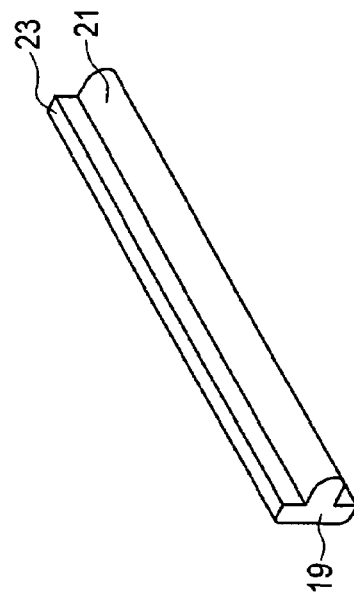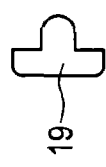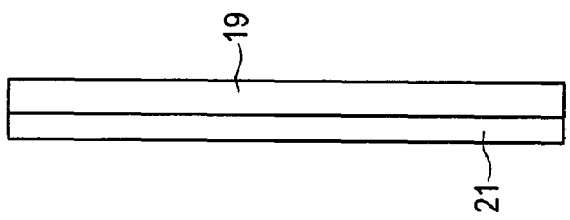

GRILLE FACING METHOD AND ARTICLE OF MANUFACTURE

CROSS REFERENCE TO RELATED APPLICATION

This patent application claims the priority of U.S. Provisional Patent Application No. 60/479,673 filed on Jun. 18, 2003, entitled Grille Facing Method and Article of Manufacture, and incorporated herein.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

This invention pertains to grille facings and more particularly to a method and article of manufacture for an automotive grille.

Grilles are typically constructed from aluminum, plastic or other rigid material as a number of parallel members or perhaps a cage or screen of members arranged in a decorative fashion. The grille may be placed in the opening surrounding an object in order to protect the object from physical intrusion, channel or deflect air flow, or simply to supply a decorative front for covering the object. In the case of an automotive vehicle an opening is formed about the radiator for a given model of vehicle. The grille is sized to fit within an opening of the subject radiator.

It may be desirable to a have a viewable exterior surface for the grille made from a different material than is the grille itself. Although the grille itself is made from plastic or aluminum it may be desirable to cover the front with a more attractive material, such as stainless steel. In the past there have been various methods to achieve an attractive grille, such as grinding the exterior surface of the individual members or the grille or using and adhesive to connect a facing to the grille.

BRIEF DESCRIPTION OF THE DRAWINGS

FIG. 5E is a perspective view of an insert joined to the billet of FIGS. 5A-D.

FIGS. 6A-D are side, rear and top schematic and perspective views of a billet for a grille of a third exemplary embodiment of the present invention.

FIGS. 6E-H are side schematic and perspective views of an insert for a grille of the embodiment of the present invention, to be used with the type of billet of FIGS. 6A-D.

SUMMARY OF THE INVENTION

A method and construction for applying a facing to a vehicle radiator grille, the method includes the steps of providing a radiator grille having fins and an insert member having a bead. Tracks or grooves are formed in the fins of the radiator grille on the viewable exterior side of the grille, the side that is visible to persons at a distance from the vehicle. The track or groove is adapted to receive the bead, and the bead is inserted into the groove to retain the insert in the groove. The aggregate one or more facing inserts affixed to the radiator comprise the facing of the radiator grille.

A radiator grille is typically made of a number of parallel fin members held together in common on the rear side by one or more supporting members. Alternatively a grille and fins can be formed from a solid piece of material, a plate of aluminum or plastic for example, with slots being machined in the plate to form the fins.

The present invention includes forming a track or groove on the front face of one or more fins or billets. The insert has an insert track or bead portion to fit in the groove and an insert face portion. The groove is complementary to a facing insert, including its bead, and otherwise formed to receive the insert.

The grooves in the fins are typically extruded in the part as it is being made, without the need for machining. Alternatively the track or groove may machined into the front face side of a single plate. A stainless steel facing insert can be likewise extruded but is typically drawn on a wire machine.

After the groove is formed a complementary facing insert made of a desirable metal, such as stainless steel, is then inserted into the groove to on the face of the fin to finish the face. A length of facing insert having a complementary track or bead to the groove is slid into the groove. In the preferred embodiment the facing insert is then swedged into place by a roller that pinches or swedges. Staking will also work to place the facing insert into the groove.

DETAILED DESCRIPTION

The following description, and the figures to which it refers, are provided for the purpose of describing example(s) and specific embodiment(s) of the invention only and are not intended to exhaustively describe all possible examples and embodiments of the invention. In the following various figures identical elements and features are given the same reference number, and similar or corresponding elements and features are or may be given the same reference numbers followed by an a, b, c, and so on as appropriate for purposes of describing the various embodiments of the present invention.

Figure 1:
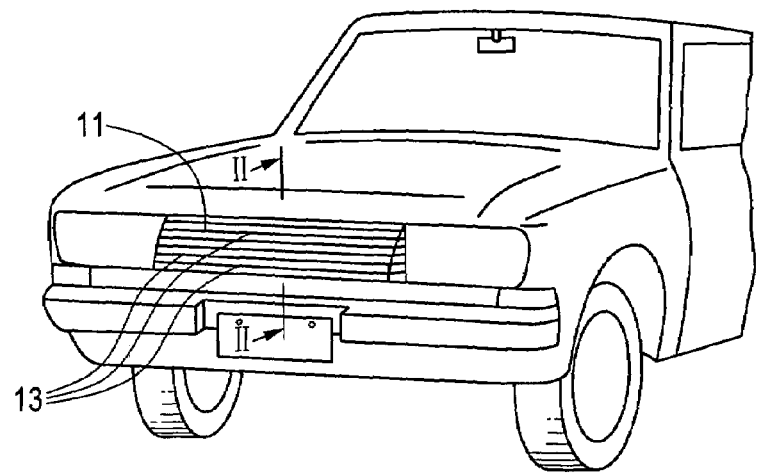
FIG. 1 is a front perspective view of a vehicle radiator grille.
Figure 2:
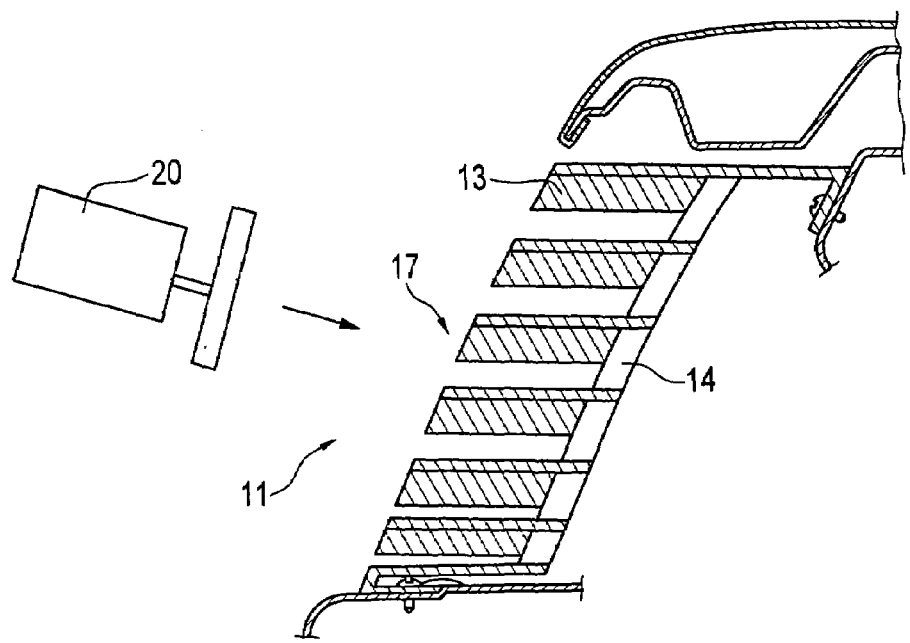
FIG. 2 is a cutaway side view of a radiator grille of the prior art

The present invention discloses a method and construction for applying a facing to an an automotive radiator grille. Referring now to FIGS. 1 and 2, in FIG. 1 a front perspective view of an exemplary metallic radiator grille 11 of the prior art for an automobile is shown, the radiator is made of a number of parallel members, fins 13, here flat metal billets (rectangular lengths) held together in common on the rear side by supporting members 14. Fins are typically produced by being formed individually and then made into a grille by inserting a round or square shape through the fins at a 90-degree angle to temporarily hold them equidistant, then welded together or to the supporting member to or to each other form the grille.

Alternatively a grille can be formed from a solid piece of material (18 in FIG. 3B) a plate of aluminum or plastic for example, with slots being machined in the plate. The face of the grille may be finished by polishing the face of the grille. In the prior art, shown in figure 2, radiator grille fins 13 might be finished by being powder-coated or painted, then the front face 17 of the fins might be ground evenly and/or polished with a grinder (shown at 20 being moved to face 17 in direction of arrow) to produce an attractive face.

Figure 3:
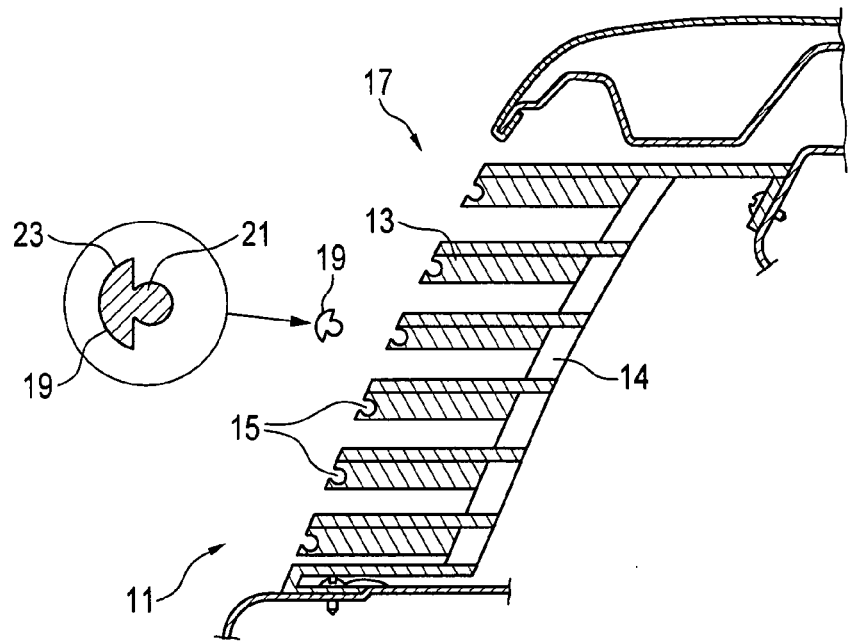
FIGS. 3 and 3A-3B are cutaway side views of radiator grilles of embodiments of the present invention.
Figure 3A:
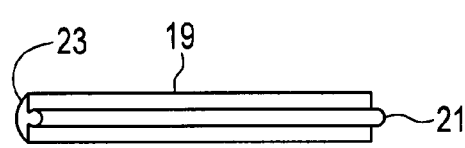
Figure 3B:
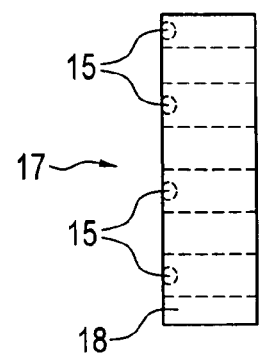
Figure 4B:
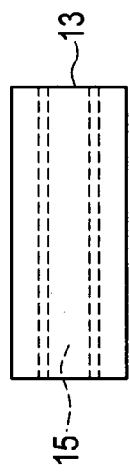
FIGS. 4A-D are side, rear and top schematic and perspective views of a billet for a grille of a first exemplary embodiment of the present invention.
Figure 4D:
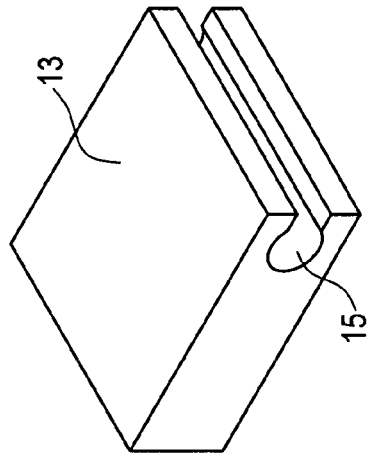
Figure 4A:
Figure 4C:
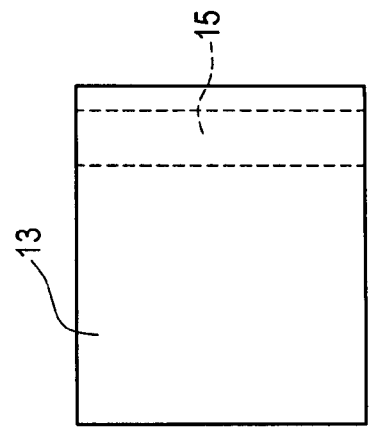
Figure 5B:
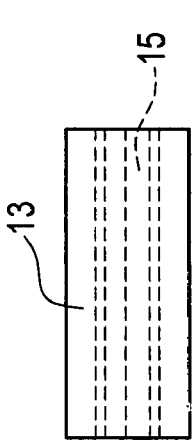
FIGS. 5A-D are side, rear and top schematic and perspective views of a billet for a grille of a second exemplary embodiment of the present invention.
Figure 5D:
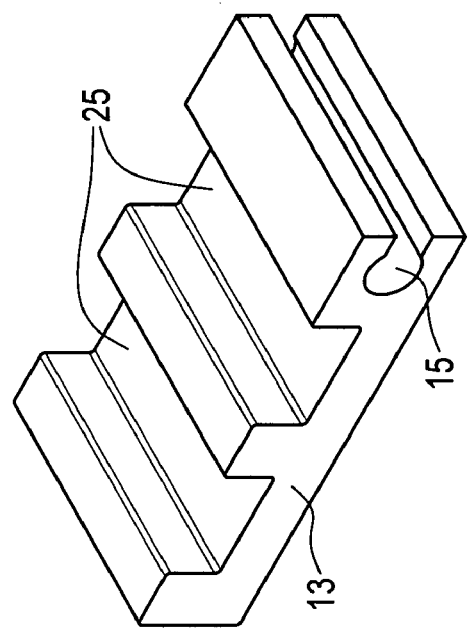
Figure 5A:
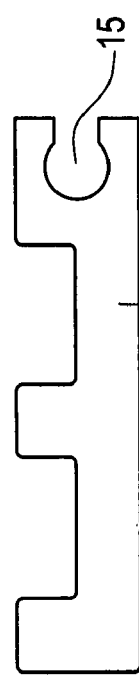
Figure 5C:
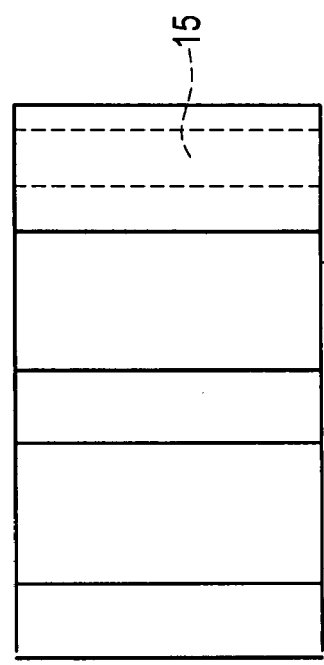
Figure 7B:
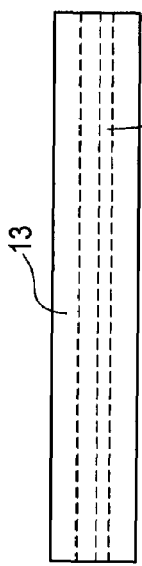
FIG. 7A-D are side, front, top and perspective schematic views an insert for a grille of the embodiment of the present invention, to be used with the type of billet of FIGS. 6A-D.
Figure 7A:
Figure 7D:
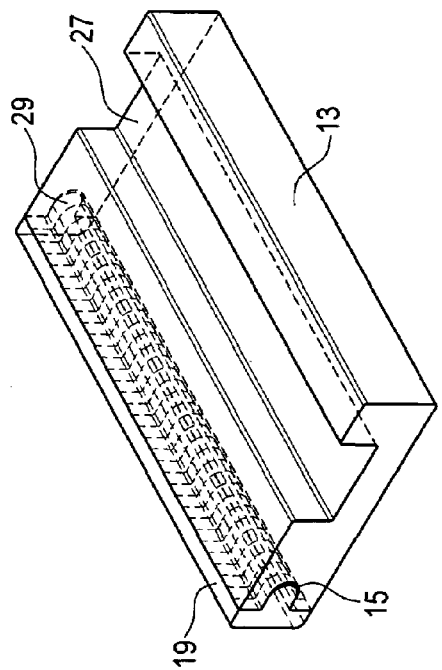
Figure 7C:
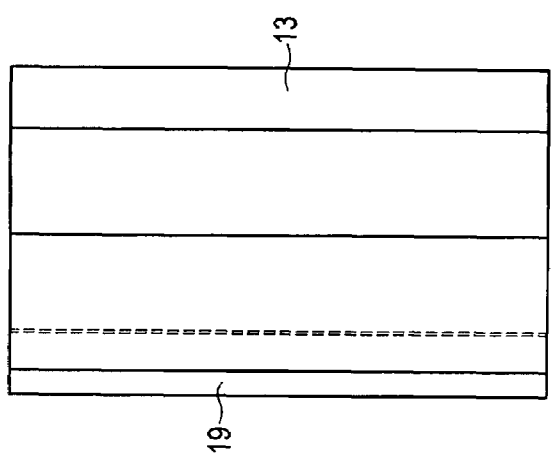

The present invention includes forming a track or groove 15 on the front face 17 of one or more fins or billets 13 of a grille 11, as shown in FIG. 3. Referring generally to all figures, the groove 15 is fitted complementary to a portion of a facing insert 19 (shown with cross-section, magnified bead portion 21 and facing insert face portion 23) made from a desirable facing material, such as stainless steel. The facing insert has a facing insert track or bead portion 21 to fit in the groove and a facing insert face portion 23 that protrudes over the fin 13. The grooves 15 in the fins 13 are typically extruded in the part as it is being made, without the need for machining. Alternatively the track or groove 15 may machined into the front face side 17 of a single plate 18, shown in FIG. 3B leaving each individual fin of the radiator grille to receive a facing insert. A stainless steel facing insert can be likewise extruded but is typically drawn on a wire machine.

It is to be understood that the present invention is not be limited to simple parallel arrangements of aluminum fins however, which are presented herein by way of example and not as a limitation. The same method can be used to produce grilles made of other materials, such as plastic or other metals, and further used to produce grilles with facings forming any design, such as aluminum shapes and filigrees. A plastic grille, for example, could be formed to have a groove to accept a complex design incorporating a stainless steel facing insert.

After the groove 15 is formed a complementary facing insert 19, made of a desirable metal, such as stainless steel, is then inserted into the groove to on the face of the fin to finish the face. A length of facing insert 19, shown at FIG. 3A, having a complementary track or bead 21 and facing 23 is slid into the groove and retained. The facing insert 19 is then swedged into place by a roller that pinches or swedges. Staking will also work to place the facing insert 19 into the groove 15.

In this manner the fins may be made of one metal, for example aluminum, and the facing insert may be made of a more desirable material, for example stainless steel. Therefore instead of finishing the face 17 by grinding, polishing or other manner, it is finished by inserting a length of the facing insert into the groove of each fin.

FIGS. 4-6 are more detailed and specific drawings showing embodiments of the present inventions, including machine drawings, dimensions shown are in inches.

FIGS. 4A-D are side, rear and top schematic and perspective views of a billet for a grille of a first exemplary embodiment of the present invention.

FIGS. 5A-D are side, rear and top schematic and perspective views of a billet for a grille of a second exemplary embodiment of the present invention. This embodiment includes an E-Channel 25 cut in the billet 13 to produce a lighter billet and therefore a lighter grille. FIG. 5E is a perspective view of a facing insert 21 joined to the billet of FIGS. 5A-D.

FIGS. 6A-D are side, rear and top schematic and perspective views of a billet for a grille of a third exemplary embodiment of the present invention. This embodiment includes a central channel 27 that, like the E-Channel, produces a lighter billet and therefore a lighter grille. FIGS. 6E-H are side schematic and perspective views of a facing insert 19 for the this embodiment of the present invention, to be used with the type of billet 13 of FIGS. 6A-D.

FIGS. 7A-D are side, front, top and perspective schematic views a facing insert 19 of the type to be used with the type of billet 13 of FIGS. 6A-6D. This embodiment show the use of an slat 29, made for example of aluminum, that is inserted into the groove 15 prior to inserting the facing insert 19. This provides for more secure retention of the facing insert 19, especially when a softer material such as plastic is used to form the billet 13. After, for example a stainless steel facing insert 19 is inserted into an aluminum slat 29, the two edges may to crimped to hold the units in place.

What is claimed is:

1. A method for applying a facing to a radiator grille, comprising the steps of:
   providing a radiator grille having fins and providing an insert member having a facing portion and a bead portion on opposite sides of the insert member,
   forming a groove adapted to receive and retain the bead portion in one or more fins of the radiator grille, by forming the groove in a complementary size and shape to that of the bead, and,
   inserting the bead into the groove.

2. The method of claim 1, further including the step of inserting a slat into the groove to help retain the facing.

3. The method of claim 1, further including the step of forming a channel in a fin retaining the facing.

4. The method of claim 3, where the channel is an E channel or a central channel in the fin retaining the bead.

5. The method of claim 1, where the facing is made from a different material than the radiator grille.

6. A method for applying a facing to a radiator grille, comprising the steps of:
   providing a radiator grille comprised of a single plate and providing an insert member having a facing portion on one side of the insert member,
   forming a groove in the radiator grille adapted to receive and retain the facing by forming the groove in a complementary size and shape to that of the bead, and,
   inserting the bead into the groove.

7. The method of claim 6, further including the step of inserting a slat into the groove to help retain the facing.

8. The method of claim 6 where the facing is made from a different material than the radiator grille.

9. The method of claim 6, where the facing is made of stainless steel.

10. A radiator grille having a facing, comprising:
    a single plate or one or more fin members formed from either a solid plate or from individual members bound together,
    the solid plate or a fin has a groove,
    a facing insert member having facing portion and a bead portion on one side that is substantially the same size and shape of the groove and,
    the bead is inserted into the groove.

11. The radiator grille having a facing of claim 10 including a slat is placed in the groove to help retain the facing.

12. The radiator grille having a facing of claim 10 where the radiator grille is formed from a single piece of material or from individual fin segments.

13. The radiator grille having a facing of claim 12 where the facing includes a bead and the facing is retained by inserting the bead into the groove.

14. The radiator grille having a facing of claim 13 where a slat is placed in the groove to help retain the bead.

15. The radiator grille having a facing of claim 12 where the grille is formed from fin segments and a channel has been formed in a fin retaining the facing.

16. The radiator grille having a facing of claim 15 where an E channel or a central channel has been formed in the fin.

17. The radiator grille having a facing of claim 10 where the facing is made from a different material than the radiator grille.

18. The radiator grille having a facing of claim 10, where the facing is made of stainless steel.

* * * * *